United States Patent [19]
Ito

[11] Patent Number: 4,786,039
[45] Date of Patent: Nov. 22, 1988

[54] RECIRCULATING DOCUMENT FEEDER

[75] Inventor: Kenshi Ito, Ramsey, N.J.

[73] Assignee: Minolta Camera Kabushiki Kaisha, Osaka, Japan

[21] Appl. No.: 122,124

[22] Filed: Nov. 17, 1987

[30] Foreign Application Priority Data

| Nov. 18, 1986 | [JP] | Japan | 61-274382 |
| Dec. 6, 1986 | [JP] | Japan | 61-291150 |
| Dec. 6, 1986 | [JP] | Japan | 61-291151 |
| Dec. 6, 1986 | [JP] | Japan | 61-291152 |
| Dec. 6, 1986 | [JP] | Japan | 61-291153 |
| Dec. 6, 1986 | [JP] | Japan | 61-291154 |

[51] Int. Cl.⁴ .......................................... B65H 31/20
[52] U.S. Cl. .................................... 271/3.1; 271/171; 271/223
[58] Field of Search ................ 271/3.1, 171, 223, 301, 271/291

[56] References Cited

U.S. PATENT DOCUMENTS

| 4,169,674 | 10/1979 | Russell . | |
| 4,219,191 | 8/1980 | Rastorguyett | 271/171 X |
| 4,469,319 | 9/1984 | Robb et al. . | |
| 4,469,436 | 9/1984 | Jones | 271/3.1 X |
| 4,597,570 | 7/1986 | Huggins . | |
| 4,621,801 | 11/1986 | Sanchez . | |
| 4,638,986 | 1/1987 | Huggins et al. . | |
| 4,660,819 | 4/1987 | Allocco, Jr. et al. . | |

Primary Examiner—Richard A. Schacher
Attorney, Agent, or Firm—Burns, Doane, Swecker & Mathis

[57] ABSTRACT

A recirculating document feeder adapted to transport each document sheet from a stack of such sheets to an exposure position through a circulation path. After printing, the sheets are returned to a sheet support portion with the front ends thereof brought to a specified position irrespective of the size of the sheets so as to be re-feedable properly. For this purpose, a sheet rear end guide for delivering the sheet to the support portion from a rear portion thereof is made movable longitudinally of the feeder to an adjusted position. A return guide is provided under the support portion toward its rear end for returning the sheet to the support portion through one of sheet delivery openings formed in the bottom plate of the support portion.

10 Claims, 7 Drawing Sheets

RECIRCULATING DOCUMENT FEEDER

BACKGROUND OF THE INVENTION

The present invention relates to a recirculating document feeder adapted to circulate each document sheet from a stack of such sheets to an exposure position. The feeder is used chiefly for copying machines for automatically repeatedly copying a predetermined number of document sheets one by one in the order of the sheets as stacked.

Recirculating document feeders of this type generally comprise means for supporting a stack of document sheets, means for sending out the sheets from the supporting means one by one, a feed path for transporting the sent-out sheet to an exposure position, and a return path for returning the sheet from the exposure position to the supporting means, as disclosed in U.S. Pat. Nos. 4,169,674, 4,597,570, 4,621,801, 4,368,986 and 4,660,819, and Examined Japanese Patent Publication No. SHO 56-40338. Such known feeders are so adapted that the plurality of sheets as stacked in the supporting means are fed to the exposure position one by one for printing and thereafter returned to the supporting means with the sheet rear ends brought to a specified position therein.

However, the known feeder encounters difficulty when to be used for document sheets of different sizes. When the sheets are returned to the supporting means after printing, the sheet rear ends are in register at the specified position, but the position of the front ends differs from size to size, such that some sheets fail to reach the specified feed position, or document sheets of a particularly size only are feedable with stability. The documents usable are therefore limited in size, and extreme inconvenience is experienced because the document sizes presently in use include A series and B series of JIS standards and other sizes in millimeters or inches and further because documents are fed to the machine as oriented in the direction of the length or width of the sheet.

SUMMARY OF THE INVENTION

A first object of the present invention is to provide a recirculating document feeder wherein document sheets, even if varying in size, can be returned to document supporting means after printing in the specified order of sheets as initially stacked in the means, with the front ends of the sheets brought to a predetermined position, so that the document sheets can be repeatedly copied reliably.

A second object of the invention is to provide a recirculating document feeder comprising delivery means which is adjustable in position longitudinally of the feeder for returning document sheets to the supporting means with the sheet front ends brought to the predetermined position, the feeder being easy to use and simplified in construction.

A third object of the invention is to provide a recirculating document feeder wherein document sheets can be returned to the predetermined position in the supporting means through a passage formed in a space under the supporting means so that the document sheets, irrespective of their size, are returnable to the specified feed position and re-feedable reliably, the supporting means being open at its upper side so as to render documents easy to place into the means and to remove therefrom while assuring the feeder of a good appearance.

A fourth object of the invention is to provide a recirculating document feeder which has two means for returning document sheets to the supporting means with the sheet front ends brought to a predetermined position, i.e., the above-mentioned position-adjustable delivery means for sheets of relatively large sizes and the above-mentioned passage under the supporting means for sheets of relatively small sizes, one of the two means being selectively usable for returning the sheets to the predetermined position in the supporting means so that document sheets of widely varying sizes are re-feedable reliably in accordance with the size of the sheet.

Other objects and features of the present invention will become apparent from the following description with reference to the accompanying drawings.

DETAILED DESCRIPTION OF THE INVENTION

Embodiments of the invention will be described below with reference to the drawings.

Figure 1:
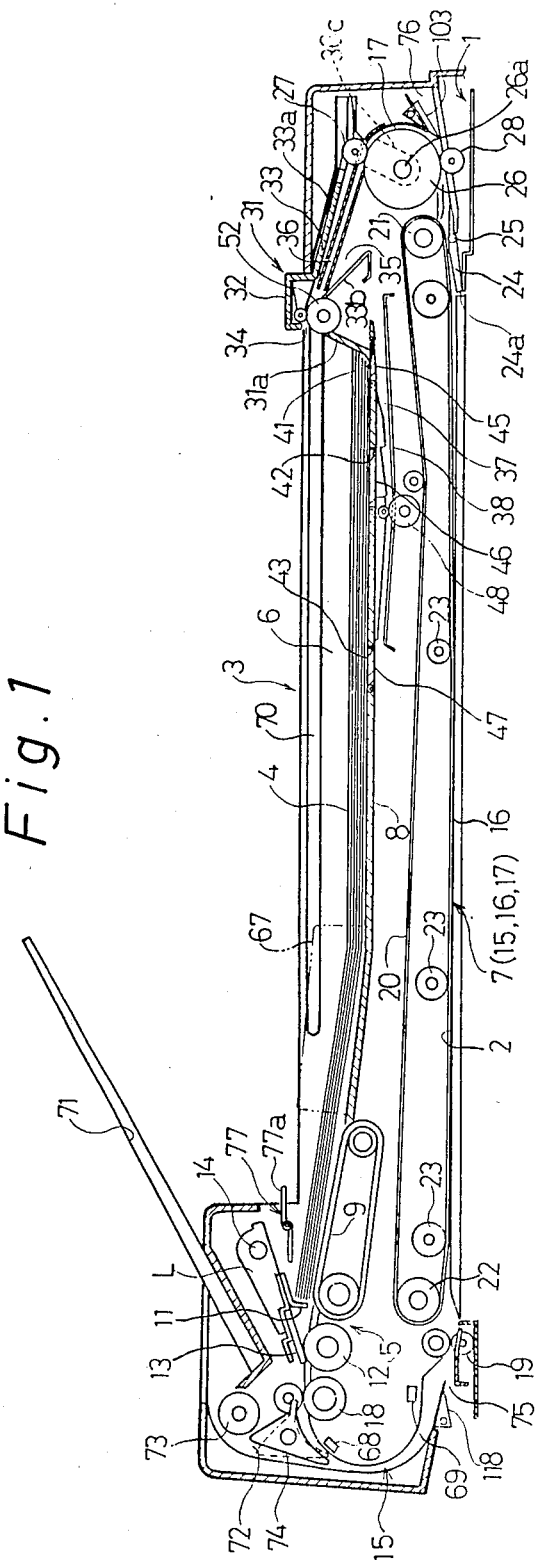
FIG. 1 is a view in vertical section of a recirculating document feeder embodying the invention for use with a copying machine.

FIGS. 1 to 4 show a recirculating document feeder, which will be described. As seen in FIG. 1, a copying machine has on the top of its main body 1 an exposure platen 2, which is covered with a case 3. The case 3 has sheet support means 6 for accommodating a stack of document sheets 4, which are sent out one by one by feed means 5. The case further has sheet transport means 7 for transporting the sheet 4 sent out from the support means 6 onto the exposure platen 2 and returning the sheet from the platen 2 to the sheet support means 6.

Figure 4:
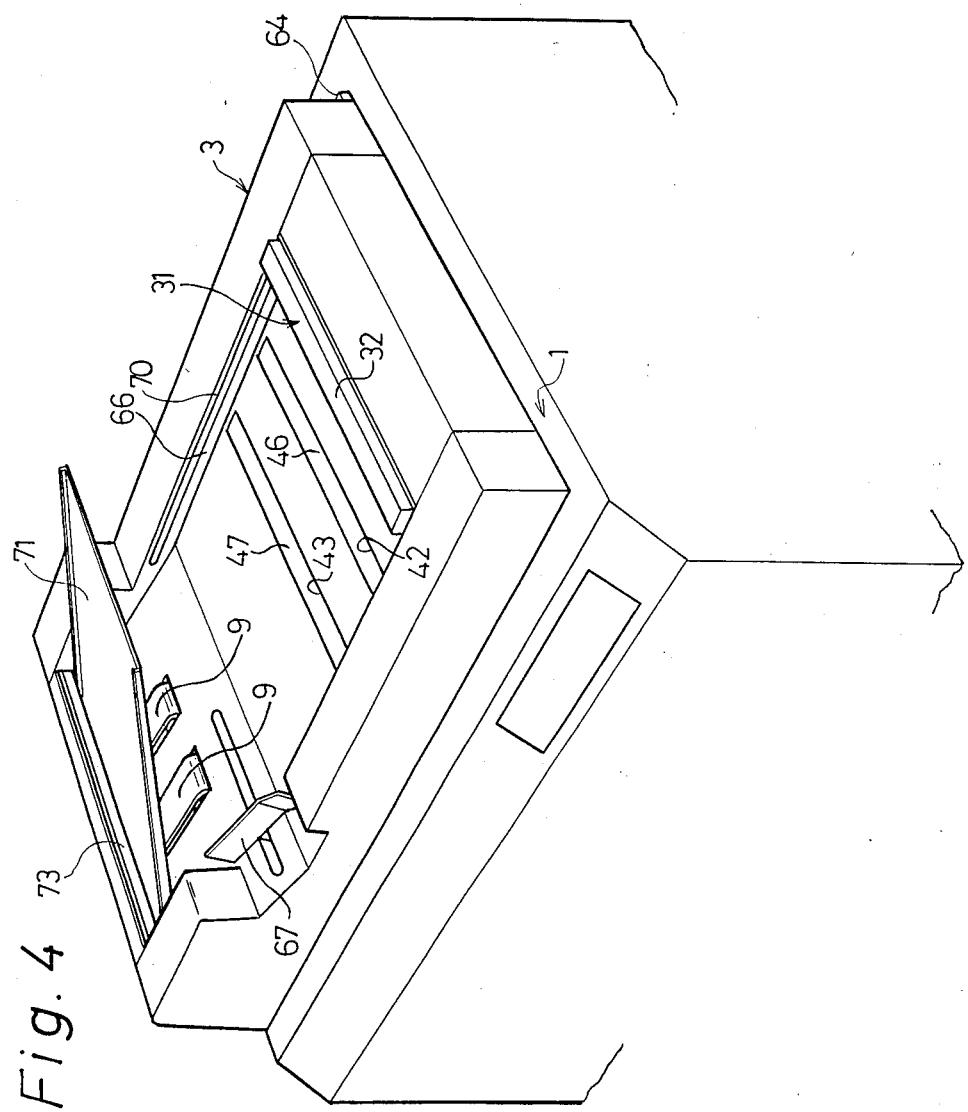
FIG. 4 is a perspective view showing the feeder as installed on the copying machine.

As seen in FIGS. 1 and 4, the sheet support means 6 is in the form of a recessed portion formed in the upper side of the case 3 and is adapted to accommodate therein a predetermined number of document sheets 4 as stacked therein. The feed means 5 comprises a dispenser belt 9 disposed at the front end of a bottom plate 8 of the support means 6 and having its upper side positioned substantially flush with the bottom plate, and a preseparating piece 11 opposed to the belt 9 from above, with a clearance formed therebetween for sending out document sheets therethrough. The dispenser belt 9 sends out sheets 4 from the lowermost position successively while the upper sheets 4 are being retained in position and restrained from being sent out. This prevents a multiplicity of sheets 4 from being sent out at once to facilitate the subsequent sheet separation.

The feed means 5 further comprises a feed roller 12 disposed immediately ahead of the belt 9, and a separating pad 13 in pressing contact with the upper portion of the roller 12. When the several sheets 4 preseparated off are forwarded by the belt 9, the lowermost sheet 4 only is further sent forward by the feed roller 12 while the other upper sheets 4 are being prevented from advancing by the separating pad 13.

The preseparating piece 11 and the separating pad 13 are attached to a lever L supported at its base end by a pivot 14. The lever L tends to move downward about the pivot 14 under gravity and is biased by an unillustrated spring, pressing the pad 13 against the feed roller 12 and remaining in a stable position to hold the preseparating piece at a predetermined level above the dispenser belt 9. Alternatively, the preseparating piece 11 may be fixed to the feeder body.

The sheet transport means 7 has a curved feed path 15 for guiding the sheet 4 sent out by the feed means 5 onto the exposure platen 2, a straight transport path 16 provided on the exposure platen 2, and a curved return path 17 for returning the sheet 4 on the platen 2 to the support means 6 from a rear portion thereof, these paths 15 to 17 being connected together. The feed path 15 is provided with a forwarding roller 18 disposed at its starting end and rotatable at a slightly higher speed than the feed roller 12, and a pair of pinch rollers 19 at its terminal end. The forwarding roller 18 receives the sheet 4 sent from the feed means 5 toward the path 15 and advances the sheet 4 into the feed path 15. At this time, the feed roller 12 idly rotates by virtue of a one-way clutch incorporated therein, following the advance of the sheet. The pair of pinch rollers 19 is held at rest for a given period of time when receiving the sheet 4 from the forwarding roller 18 and is not driven before the opposite sides of the sheet front end come into pressing contact with the nip of the rollers 19 even if the sheet 4 is skew, whereby the sheet 4 is positioned properly with its front edge at right angles with the feed direction and then delivered to the straight path 16 on the exposure platen 2.

The straight transport path 16 is provided by the exposure platen 2 and a conveyor belt 20 in pressing contact with the upper surface of the platen 2. The belt 20 is disposed under the bottom plate 8 of the support means 6, reeved around a drive roller 21 and a driven roller 22 and pressed into contact with the exposure platen 2 by guide rollers 23 arranged between the rollers 21, 22. The sheet 4 fed from the feed path 15 is guided onto the platen 2 by the conveyor belt 20 and is thereafter sent into the curved return path 17.

A sheet positioning member 24 is disposed at the return end of the straight transport path 16 off the exposure platen 2. The member 24 is pivoted to the copying machine main body 1 by a pin 25 at the rear end of the member and has a front edge 24a which is movable by an unillustrated solenoid or like drive means to a usual position where the edge is lower than the platen 2, or to a stopper position where it is higher than the platen 2. The positioning member 24, when in the usual position, guides the sheet 4 upward into the curved return path 17 when it is sent out from the platen 2. When the member 24 is in the stopper position, the front end of the sheet 4 sent forward on the exposure platen 2 is arrested by the front edge 24a, whereby the sheet 4 is held in a specified printing position on the platen 2.

The document sheet 4 must be thus positioned when the copying machine has an exposure optical system for scanning or is adapted to expose the entire surface of the sheet to light at a time. However, the sheet 4 need not be stopped when to be scanned while it is being transported. The present embodiment is adapted for use with both types of copying systems.

The curved return path 17 has a transport roller 26 having a large diameter at an intermediate portion. Driven rollers 27 and 28 are pressed into contact with the peripheral surface of the roller 26 from above and below, respectively, whereby the sheet 4 transported into the path 17 from the exposure position (platen) 2 is further transported around the roller 26 while being curved and then returned to the support means 6 from its rear end.

Provided at the rear end of the sheet support means 6 is a rear end guide 31 for guiding the rear end of the sheet 4 to be accommodated, into contact with the preselecting piece 11. The rear end guide 31 is movable within the support means 6 longitudinally of the feeder in accordance with the size of the sheet 4. The guide has a slightly slanting front guide wall 31a for guiding the rear end of the sheet 4 to a specified feed position in which the front end of the sheet 4 is in contact with the preselecting piece 11.

As shown in FIGS. 1, 2 and 4 to 8, the rear end guide 31 comprises a synthetic resin cover 33 resembling a mound in cross section and having a knob 32 projecting upward from the case 3. A rearward wall 33a of the cover 33 and a metal guide wall 33b fixedly provided inside the cover 33 define a sheet inlet opening 35 which is greatly opened rearward and tapered toward an outlet 34 at the base of the knob 32 on the front side thereof.

The sheet inlet opening 35 is movable with the rear end guide 31 which is moved for the adjustment of its position. For the opening 35 to accept the sheet 4 from the return path 17 at any position, the portion of the path 17 beyond the transport roller 26 is in the form of a swingable movable transport channel 36. Consequently, in the range of adjusting movement of the rear end guide 31 from the rearmost position A0 in FIG. 5 to the first advanced position A1 of FIG. 6, the movable transport channel 36 is positioned inside the inlet opening 35, whereby the sheet 4 sent out from the return path 17 can be properly guided into the opening 35.

Figure 7:
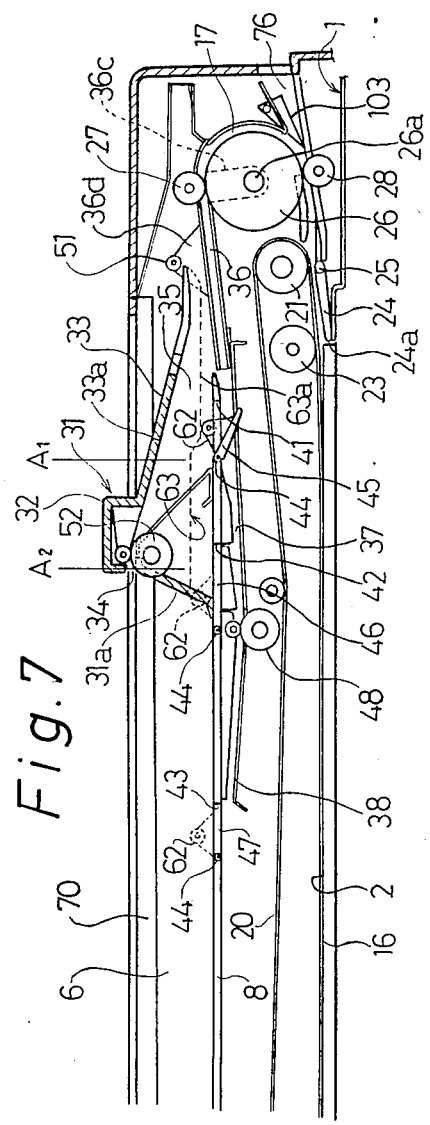
FIG. 7 is a view in vertical section showing the feeder with the delivery means set in another advanced position A2, the view further showing an opened rear sheet delivery opening.
Figure 8:
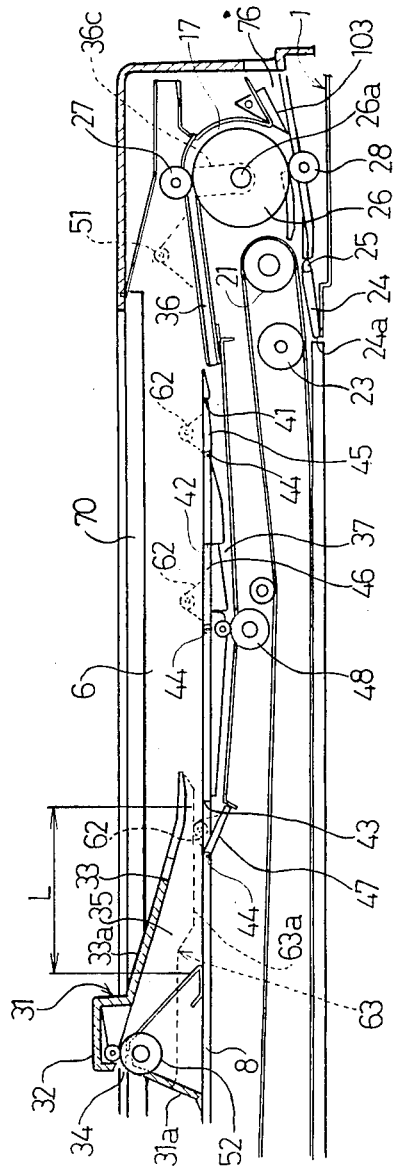
FIG. 8 is a view in vertical section showing the feeder with the delivery means set in the most advanced position, the view further showing an opened front sheet delivery opening.

When the rear end guide 31 is further moved forward from the first advanced position A1, the channel 36 is moved out of the opening 35 and made continuous with an auxiliary return passage 37 as seen, for example, in FIG. 7. The passage 37 is provided by a return guide 38 disposed under the bottom plate 8 of the support means 6. While the return passage 37 receives the sheet 4 from the movable channel 36 connectable thereto, the bottom plate 8 is formed with sheet delivery openings 41, 42 and 43 in corresponding relation to other advanced positions of the guide 31. As illustrated, the delivery openings 41, 42, 43 are provided with closures 45, 46, 47, respectively, each pivotably supported by a pin 44 at its front end and fittable into the delivery opening flush with the bottom plate 8. The closure is biased into the closed position by an unillustrated spring. One of the closures is opened in corresponding relation to the advanced position of the rear end guide 31 as shown in FIG. 7 or 8 to guide the sheet 4 through the opened delivery opening 41, 43 or the like as the sheet is transported through the auxiliary passage 37, whereby the sheet can be properly sent into the inlet opening 35 at the advanced position.

As the sheet size decreases, the rear end guide 31 is advanced for the auxiliary return passage 37 to transport the sheet a longer distance. To assure the transport over a long distance, the passage is suitably provided with a pair of transport rollers 48 at an intermediate portion.

Figure 2:
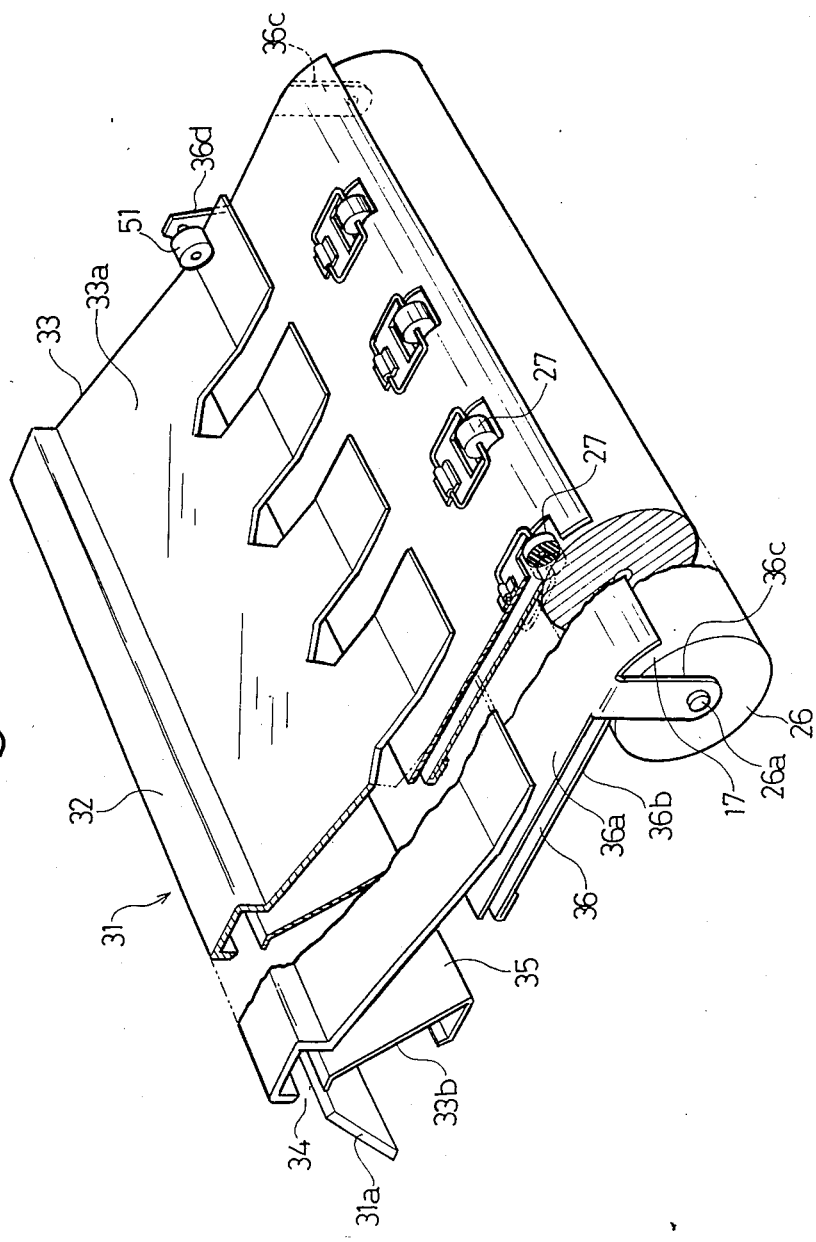
FIG. 2 is a perspective view partly broken away and showing the relation between a movable transport channel at the terminal end of sheet transport means an delivery means for delivering document sheets to sheet support means.

An arrangement will be described below for adjusting the orientation of the movable transport channel 36 in accordance with the shift of the rear end guide 31. As seen in FIG. 2, the transport channel 36 is provided by front and rear guide plates 36a, 36b. The rear guide plate 36b extends forward substantially tangentially of the periphery of the transport roller 26. The front guide plate 36a is provided over the plate 36b and a portion of the peripheral surface of the roller 26 along the plate 36b to form a given clearance between the two plates as the transport path. The front and rear guide plates 36a, 36b are connected together in combination. Arms 36c extending from opposite sides of the front guide plate 36a are pivotally supported by the shaft 26a of the transport roller 26. Thus, the channel 36 extends tangentially of the periphery of the roller 26 and is made swingable about the axis of the roller 26, whereby the orientation of the tangential transport channel can be changed without changing the state of the path.

The driven rollers 27 are supported by the front guide plate 36a at the position where the channel 36 extends from the roller 26 tangentially thereof. The driven rollers 27 follow the swinging movement of the channel 36 and are always positioned where the channel 36 extends from the periphery of the roller 26 tangentially thereof. Consequently, the sheet 4 forwarded around the roller 26 through the curved return path 17 can be smoothly transferred to the channel 36 at all times.

Figure 5:
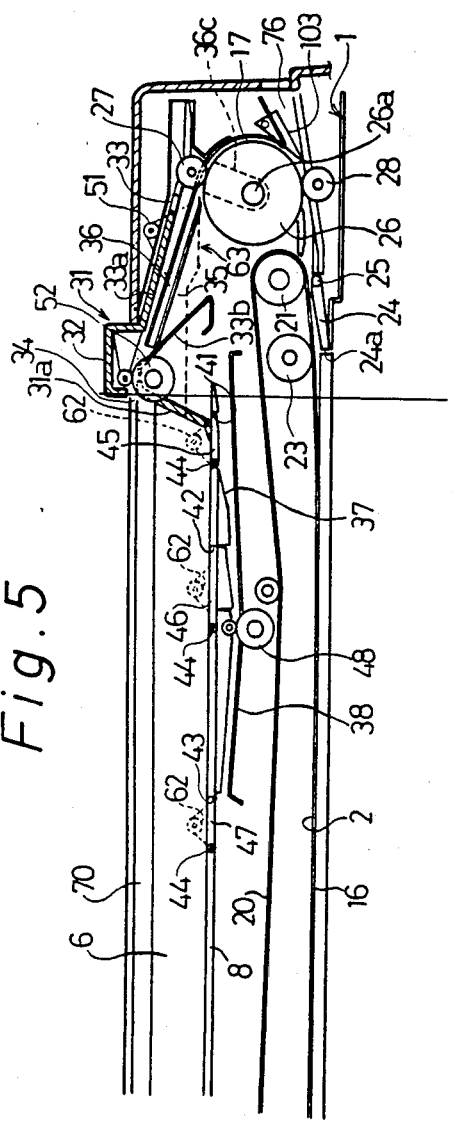
FIG. 5 is a view in vertical section showing the feeder with the delivery means set in the rearmost position A0.
Figure 6:
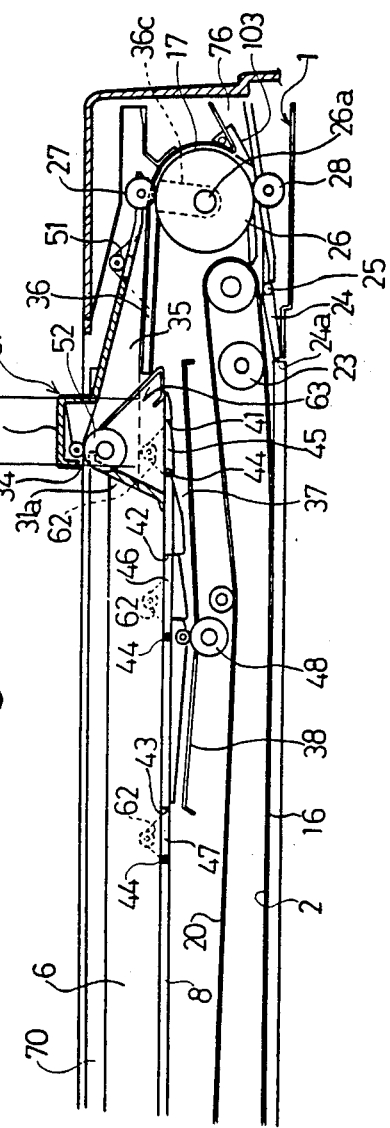
FIG. 6 is a view in vertical section showing the feeder with the delivery means set in an advanced position A1.

The front guide plate 36a has at its one side edge an upward arm 36d supporting a driven roller 51 thereon. The rear end guide 31, when shifted, allows the roller 51 to ride on the rearward wall 33a of the cover 33 as seen in FIG. 2, placing the movable transport channel 36 into the inlet opening 35 as shown in FIG. 5 or 6. When the rearward wall 33a is released from the driven roller 51 as seen in FIG. 7 or 8, the guide plates 36a, 36b forming the channel 36 are allowed to move down under gravity to rest on the return guide 38 providing the auxiliary return passage 37, whereby the channel 36 is connected to the passage 37.

The outlet 34 of the rear end guide 31 is provided with a pair of discharge rollers 52, whereby the sheet 4 sent into the inlet opening 35 is positively discharged to the support means 6 until the rear end of the sheet is properly placed into the means 6.

An arrangement will now be described for opening each of the closures 45 to 47 for the delivery openings 41 to 43 with the shift of the rear end guide 31.

Figure 3:
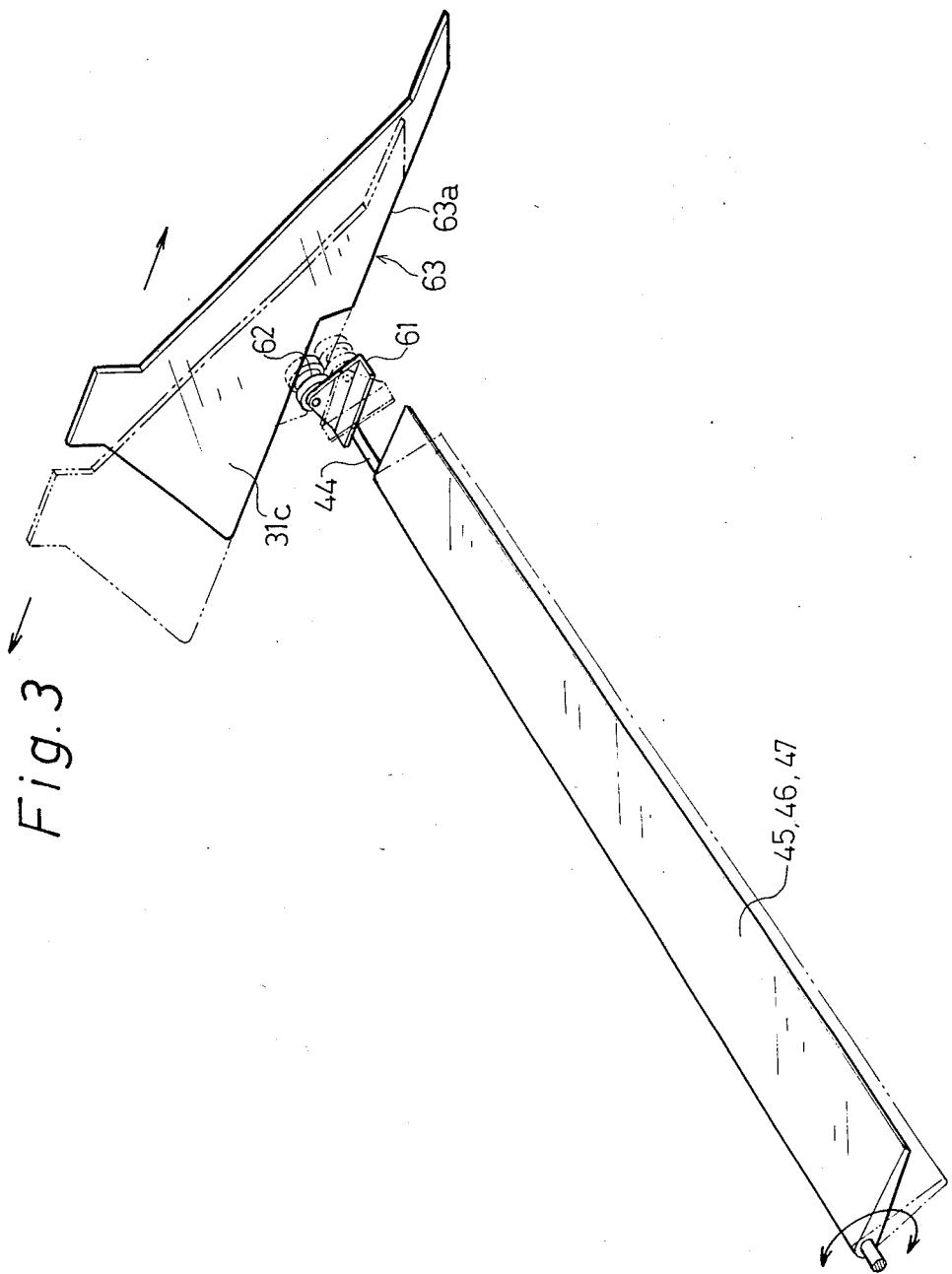
FIG. 3 is a perspective view showing an arrangement for opening a closure for each of sheet delivery openings.

As shown, for example, in FIG. 3, a frame 61 is secured to the rod 44 supporting each of the closures 45 to 47 and has supported thereon a driven roller 62. On the other hand, the side wall 31c of the rear end guide 31 is formed at its lower edge with a cam 63 opposed to the driven roller 62. The cam 63 has a downwardly projecting edge 63a, which depresses the driven roller 62 for one of the closures 45 to 47 which corresponds to the position of the guide 31, whereby the closure concerned is opened.

The sheet inlet opening 35 of the rear end guide 31 is positionable for each of the delivery openings 41 to 43 over a large distance L as seen in FIG. 8, so that even if the opening 35 is shifted relative to the delivery opening within the range of distance L longitudinally of the feeder, the sheet 4 can be received by the opening 35. This feature and also the foregoing relation between the rear end guide 31 and the movable transport channel 36 permit the feeder to handle document sheets of slightly varying sizes and also more different sizes including A series and B seris of JIS standards and other sizes in millimeters or inches, further allowing such sheets of varying sizes to be fed along the length or width of the sheet.

Although the rear end guide 31 is movable with good stability by being guided by the inner surface of the sheet support means 6, it is desirable to offer suitable resistance to the movement of the guide 31 to avoid inadvertent movement thereof. The drive shaft for the discharge rollers 52 on the guide 31 extends into the case 3 through a slit 70 formed in the side wall of the support means 6 and is connected to a drive source. The slit is also usable for guiding the rear end guide 31. The side wall 31c of the guide 31 also extends through the slit 70 into the case 3 for contact with the driven roller 62 within the case 3. However, these members may be arranged or constructed otherwise as desired.

As shown in FIG. 4, the case 3 is removably attached to one side of the top of the copying machine main body 1 by a hinge 64 and can be raised as moved about the hinge 64 to an opened position to expose the platen 2. In this way, the cover 3 can be handled in the same manner as the usual document cover for printing.

At one side of the front end of the support means 6, there is provided a movable guide 67 which is movable toward or away from a sheet guide wall 66 at the other side.

A document sheet discharge tray 71 extends obliquely upward from the front end of the case 3. The sheet 4 can be discharged onto the tray 71 through a discharge path 72 branching from the feed path 15 upward, by reversely rotating the conveyor belt 20 and the pinch rollers 19 and driving a discharge roller 73, with a path change pawl 74 shifted from a usual position indicated in solid line in FIG. 1 to a phantom-line discharge position. The curved feed path 15 is also provided with a feed-discharge branch opening 75 immediately in front of and under the pinch rollers 19. on the other hand, the curved return path 17 has a feed-discharge branch opening 76 immediately in the rear of the nip of the transport roller 26 and the driven roller 28.

The feeder is used in the following manner. It is desirable to move the rear end guide 31 and the movable guide 67 to positions for the maximum size first and then to place the desired number of document sheets into the support means 6 as stacked therein, so as to place the sheets 4 without interference with the guide 31 or 67.

For the placement of the stack of sheets 4, the front end of the stack is brought forward into contact with the preseparating piece 11 of the feed means 5 by the hand holding the rear end of the stack, whereby the sheets 4 can be placed substantially in the specified feed position. The sheets 4 can be placed in position smoothly if the dispenser belts 9 are set free at this time to follow the insertion of the sheets.

Subsequently, the rear end guide 31 is set in position indicated for the size of the sheets 4, causing the guide wall 31a thereof to push the rear end of the stack of sheets 4, whereby the stack can be easily set in the specified feed position with its front end in contact with the preseparating piece 11 properly. When the movable guide 67 is slidingly moved, the stack can be pushed on one side edge thereof to press the other side edge thereof against the guide wall 66, whereby the sheets 4 can be registered also with respect to a direction perpendicular to the feed direction.

FIG. 1 shows the sheets 4 of maximum size thus accommodated in place as stacked. In this state, the print switch is depressed, with the number of prints set, for example, to 3, whereupon the dispenser belts 3, feed roller 12 and forwarding roller 18 are driven first. The lowermost sheet 4 is thereby sent out from the stack. Upon reaching the forwarding roller 18, the sent-out sheet 4 is further transported by the roller 18 through the curved feed path 15. The path 15 is provided with sheet sensor switches 68 and 69 immediately in the rear of the roller 18 and immediately in front of the pinch rollers 19, respectively. These switches detect the position of the sheet 4 and also the speed of transport thereof from the passage of the sheet from the switch 68 to the switch 69, whereby all the variations in the speed of transport of the sheet 4 are directly measured which are due to variations in the voltage between lines, tolerance of drive motor, wear of drive gears, slippage or drag of the sheet 4, etc. to properly adjust the timing in accordance with the measurements.

The sheet 4 transported through the path 15 comes into contact with the pair of pinch rollers 19 at rest, whereby the skew of the sheet is remedied. The sheet 4 is thereafter transported through the straight path 16 on the exposure platen 2 by the operation of the pinch rollers 19 and the conveyor belt 20 and comes into contact with the positioning member 24 which is in its raised position at this time. Consequently, the sheet 4 is thereby halted in the predetermined printing position on the platen 2. The contact of the front end of the sheet 4 with the member 24 remedies the skew of the sheet 4.

Upon the sheet 4 coming into proper contact with the positioning member 24, the conveyor belt 20 is brought out of operation. In this state, the sheet 4 is exposed to light by being scanned by the optical system. Before or after the completion of exposure, the positioning member 24 is lowered. On condition that the member 24 is in its lowered position, the belt 20 resumes its operation. At the same time, the movable components of the return path 17 are operated, and the discharge rollers 52 on the rear end guide 31 are also driven. When the sheet 4 is continuously transported through the path 16 for scanning, the positioning member 24 is held in its lowered position at all times.

The exposed sheet 4 on the exposure platen 2 is sent through the path 17 and the inlet opening 35 to the pair of discharge rollers 52 by the operation of the conveyor belt 20 and delivered through the outlet 34 to the support means 6 by the discharge rollers 52, which are stepped to wave the outgoing sheet 4 longitudinally of the feeder, permitting the sheet 4 to advance straight easily.

At this time, an auxiliary transport wheel 77 is in operation which has blades 77a of urethane or the like and which is disposed immediately in the rear of the feed means 5. The wheel elastically acts on the sheet 4 returned and delivered onto the preceding stack of sheets 4 in the support means 6. Being thus urged and permitted to advance straight readily as stated above, the sheet 4 can be properly placed in the specified feed position in contact with the preseparating piece 11.

A known document separating pawl (not shown) is placed on the series of document sheets 4 as initially stacked in the means 6 for distinguishing the remaining stack of sheets 4 from the sheet or sheets 4 placed thereon upon returning.

A suitable period of time before printing for the sheet 4 on the exposure platen 2 is completed or after printing, the feed means 5 operates again to send out another sheet 4 from the lowermost position of the stack in the support means 6. In the same manner as the preceding sheet, the sheet 4 is thereafter transported for printing and returned to the support means 6.

When the last of the series of sheets 4 has been sent out, there remains no sheet supporting the separating pawl, permitting the pawl to temporarily fall from the support means 6. When the last sheet 4 is returned to the sheet support means 6 after printing, the pawl is turned upside down and placed on the series of sheets 4 as stacked in the means 6.

Thus, every time a series of prints has been completed for the stack of sheets 4, the movement of the pawl indicates the completion.

A preset number of copies of the document are printed in succession. When making the last series of prints, the conveyor belt 20, the forwarding roller 18 and the pinch rollers 19 are reversely driven and the discharge roller 73 is also driven with the path change pawl 74 in the phantom-line position in FIG. 1, upon completion of printing for the sheet 4 on the exposure platen 2.

Accordingly, the document sheet 4 a print of which has been made is reversely transported from the straight path 16 to the curved feed path 15 and delivered onto the sheet discharge tray 71 by the discharge roller 73. Since every sheet 4 is discharged onto the tray 71 after the last print has been made, the sheet support means 6 becomes empty after printing. On completion of printing, the sheet support means 6 is usable for accommodating another series of document sheets 4 to quickly start the subsequent printing operation. Incidentally, the sheet 4 may be returned to the support means 6 after the last printing.

With the preceding series of document sheets 4 remaining on the tray 71 as delivered thereto, another series of document sheets 4 may be subsequently discharged onto the tray after printing, as placed over the preceding series of sheets.

In such a case, the following series of sheets is delivered onto the tray 71 as shifted from the position of the preceding series in a direction perpendicular to the direction of discharge of sheets. The two series on the tray 71 can then be apparently distinguished owing to the difference in position. This assures convenience when printing at least two different documents in succession, for example, when a person starts printing for his own purpose while another person, preparing prints of his document, is away from the machine. Document sheets of one person and those of another person can be readily distinguished when delivered onto the tray in the above-mentioned arrangement.

Figure 9:
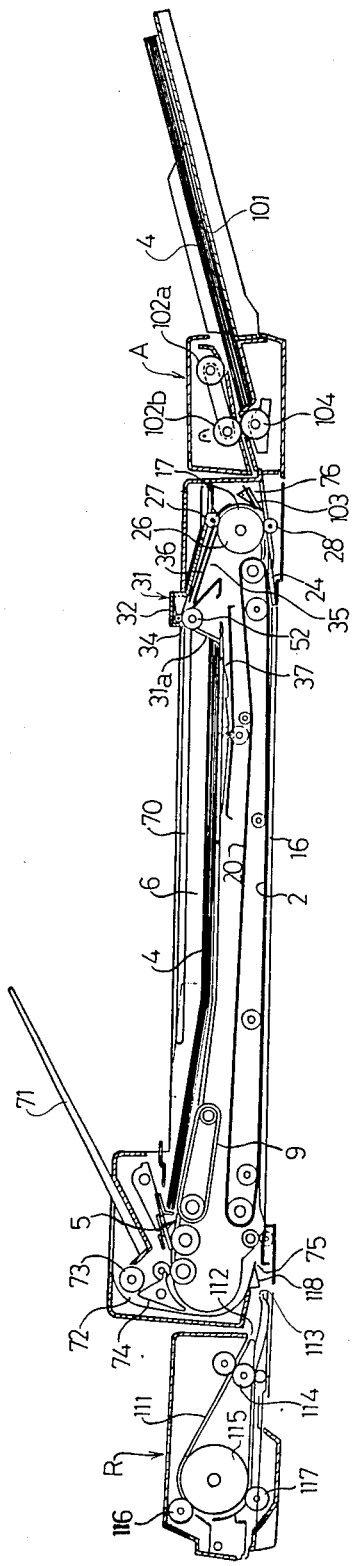
FIG. 9 is a view in vertical section showing the feeder having connected thereto an automatic document feed unit A and a document inverting unit R.

As seen in FIG. 9, the recirculating document feeder of FIG. 1 is usable as connected to another automatic document feed unit A and a document inverting unit R. This arrangement will be described. With the automatic document feed unit A, document sheets 4 as stacked on tray 101 are sent out from the uppermost position by feed rollers 102a, 102b and a reversely rotatable separating roller 104. The sheet 4 sent out is passed through the feed-discharge opening 76 into the curved return path 17 and reversely transported into the straight path 16 by the transport roller 26 and the driven roller 28 which are in reverse rotation. The conveyor belt 20 providing the straight path 16 is reversely driven, drawing the sheet 4 onto the exposure platen 2. On completion of drawing, the belt 20 is driven forward to bring the sheet 4 into contact with the sheet positioning member 24 in its raised position and thereby position the sheet 4 for printing as specified.

While the sheet 4 may be discharged onto the tray 71 after printing, the sheet 4 is returned to the support means 6. Although the sheets 4 on the tray 101 are fed for printing from the uppermost position one after another, they are stacked in the support means 6 in an order reverse to that on the tray 101. However, the sheets are sent out from the lowermost position in the support means, with the result that prints are made in the same order as the order of sheets on the tray 101.

Thus, the sheets 4 are stacked on the tray 101 in an order reverse to the printing order of the sheets in the support means 6 but can be printed in the specified order. Further a desired number of copies of prints in the specified order can be produced automatically using the sheet support means 6.

Through the feed-discharge opening 75 of the curved feed path 15, the document inverting unit R receives the sheet 4 from the straight transport path 16 and delivers the sheet to the path 16. On completion of printing, the sheet 4 on the exposure platen 2 is transported through the feed-discharge opening 75 into an inverting transport path 111 within the unit R via an outlet 112 thereof by the conveyor belt 20 which is driven reversely. The inverting transport path 111 is in the form of a loop extending from the outlet 112 to an inlet 113 thereunder. The sheet 4 sent in is inverted along the loop and then sent out, as turned upside down, from the inlet 113 into the straight transport path 16 via the feed-discharge opening 75. The conveyor belt 20, now traveling in the forward direction, transports the inverted sheet 4 toward the positioning member 24, whereby the sheet 4 can be set in the specified exposure position.

Thus, after a print of one surface of the sheet 4 is obtained, the sheet is placed on the exposure platen 2 upside down using the inverting unit R to make a print of the other surface. After double-face copying, the sheet 4 is handled as desired in the same manner as already described.

To receive and deliver the sheet 4 reliably, the inverting transport path 111 is provided with transport rollers 114 at the outlet 112 and inlet 113. The path 111 further has a transport roller 115 along a curved intermediate portion thereof and driven rollers 116, 117 in pressing contact with upper and lower portions of the roller 115. The curved feed path 15 has a path change member 118 at the branch portion of the feed-discharge opening 75.

The rear end guide 31 and the movable guide 67 may be shifted to a suitable position before placing sheets 4 into the support means 6, in conformity with the size of the sheets 4. These guides, especially the rear end guide 31, can be shifted electrically automatically as by a solenoid upon specifying the size.

What is claimed is:

1. A recirculating document feeder adapted to circulate each document sheet from a stack of such sheets to an exposure position, said feeder comprising:
   means for supporting the stack of sheets,
   means for sending out the sheets from the front end of said supporting means one by one,
   sheet transport means for transporting the sent-out sheet to the exposure position and returning the sheet from the exposure position toward said supporting means after exposure,
   sheet discharge means for receiving the returned sheet from said transport means, moving the sheet through a passage under a rear portion of said supporting means and thereafter delivering the sheet from said passage to said supporting means thereabove, said sheet discharge means having a plurality of sheet delivery openings arranged longitudinally of said feeder at different positions, and
   means for guiding the sheet traveling through said passage so as to discharge the sheet from one of said sheet delivery openings.

2. A feeder as defined in claim 1 wherein said passage is formed between a bottom plate providing said supporting means and a return guide positioned under said bottom plate, and said plurality of sheet delivery openings are formed in said bottom plate, said sheet discharge means having a pair of transport rollers disposed at an intermediate portion of said passage.

3. A feeder as defined in claim 1 wherein said sheet guiding means comprises a closure openably provided for each of said sheet delivery openings for guiding the sheet upward to said supporting means when opened.

4. A feeder as defined in claim 1 wherein said supporting means is provided therein with a sheet rear end guide movable longitudinally of said feeder for guiding the rear end of the sheet to place the front end thereof in position, and the sheet discharged from the sheet delivery opening is delivered to the specified position in said supporting means by said rear end guide.

5. A recirculating document feeder adapted to circulate each document sheet from a stack of such sheets to an exposure position, said feeder comprising:
   means for supporting the stack of sheets,
   means for sending out the sheets from the front end of said supporting means one by one,
   sheet transport means for transporting the sent-out sheet to the exposure position and returning the sheet from the exposure position toward said supporting means after exposure,
   delivery means for receiving the returning sheet from said transport means and delivering the sheet to said supporting means from a rear portion thereof, said delivery means being movable longitudinally of said feeder and settable in position according to the size of the sheet,
   sheet discharge means for receiving the returned sheet from said transport means, moving the sheet through a passage under a rear portion of said supporting means and thereafter delivering the sheet from said passage to said supporting means thereabove, said sheet discharge means having a plurality of sheet delivery openings arranged longitudinally of said feeder at different positions, and means for guiding the sheet traveling through said passage so as to discharge the sheet from one of said sheet delivery openings, said sheet transport means including a sheet returning portion positioned at the terminal end thereof and providing a movable transport channel, said movable transport channel being selectively connectable to one of said delivery means and said sheet discharge means.

6. A feeder as defined in claim 5 wherein said delivery means comprises a pair of discharge rollers for delivering the sheet to said supporting means, a slanting rear guideface for guiding the sheet received from said transport means to said pair of discharge rollers, and a front guide wall for guiding the sheet delivered from said pair of discharge rollers to said supporting means and guiding the rear end of the sheet to place the front end thereof in position.

7. A feeder as defined in claim 6 wherein said movable transport channel has a swingable forward end, the channel forward end being in contact with or adjacent to said slanting rear guide face and connected to said delivery means when said delivery means is in a specified range of longitudinal movement, the channel forward end being away from said slanting rear guide face and connected to said sheet discharge means when said delivery means is positioned forwardly of the specified range of movement.

8. A feeder as defined in claim 5 wherein said passage is formed between a bottom plate providing said supporting means and a return guide positioned under said bottom plate, and said plurality of sheet delivery openings are formed in said bottom plate, said sheet discharge means having a pair of transport rollers disposed at an intermediate portion of said passage.

9. A feeder as defined in claim 5 wherein said sheet guiding means comprises a closure openably provided for each of said sheet delivery openings for guiding the sheet upward to said supporting means when opened.

10. A feeder as defined in claim 5 wherein when the sheet received by said sheet discharge means is to be delivered through said sheet delivery opening to said supporting means by being guided by said sheet guiding means, said delivery means is positioned in front of and close to said delivery opening, and the sheet is delivered to a specified position in said supporting means via said delivery means.

* * * * *